United States Patent
Fleury

(10) Patent No.: US 7,575,779 B2
(45) Date of Patent: Aug. 18, 2009

(54) METHOD OF APPLYING MOISTURE-ABSORBENT POWDER ON CABLE ELEMENTS

(75) Inventor: Daniel Fleury, Calais (FR)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 11/941,490

(22) Filed: Nov. 16, 2007

(65) Prior Publication Data

US 2008/0060578 A1 Mar. 13, 2008

Related U.S. Application Data

(62) Division of application No. 10/878,366, filed on Jun. 29, 2004, now Pat. No. 7,323,057.

(30) Foreign Application Priority Data

Jun. 30, 2003 (FR) .................................. 03 07884

(51) Int. Cl.
*B05D 1/30* (2006.01)
(52) U.S. Cl. ...................... 427/180; 427/195
(58) Field of Classification Search ................ None
See application file for complete search history.

(56) References Cited

U.S. PATENT DOCUMENTS

| 2,742,867 A | 4/1956 | Rhodes |
| 2,893,332 A | 7/1959 | Rosner et al. |
| 3,000,752 A | 9/1961 | Jackson et al. |
| 3,152,010 A | 10/1964 | Case |
| 3,210,017 A | 10/1965 | Nordell |
| 3,389,010 A | 6/1968 | Burch |
| 3,558,009 A * | 1/1971 | Carter ........................... 222/1 |
| 4,070,503 A * | 1/1978 | Robert et al. ................ 427/120 |
| 4,301,763 A * | 11/1981 | Goldstone et al. ........... 118/308 |
| 4,334,494 A * | 6/1982 | Kane ............................ 118/63 |
| 4,597,358 A * | 7/1986 | Aitken ......................... 118/24 |
| 6,332,249 B1 | 12/2001 | Oda et al. |

FOREIGN PATENT DOCUMENTS

| DE | 32 47 498 A1 | 6/1984 |
| GB | 133697 | 7/1920 |
| GB | 932923 | 7/1963 |
| GB | 1 220 427 | 1/1971 |
| GB | 1 378 748 | 12/1974 |
| GB | 2 167 002 | * 5/1986 |
| GB | 2 167 002 A | 5/1986 |

OTHER PUBLICATIONS

US (SIR) Basnar et al. H11, Jan. 7, 1986.

* cited by examiner

*Primary Examiner*—Frederick J Parker
(74) *Attorney, Agent, or Firm*—Sughrue Mion, PLLC

(57) ABSTRACT

A method of applying moisture-absorbent powder on cable elements. The method includes the steps of providing a hopper; placing a powder in the hopper (2) of an applicator; conveying the cable elements below the opening in the hopper; and moving the mechanical stirrer in the hopper (2) of the applicator such that the powder (20) contained in the hopper (2) flows under gravity as far as a mesh (9) located in the bottom part of the hopper (2), being stirred by the stirrer (9), passes through the mesh and continues to flow under gravity until coming into contact with the cable elements (5).

9 Claims, 2 Drawing Sheets

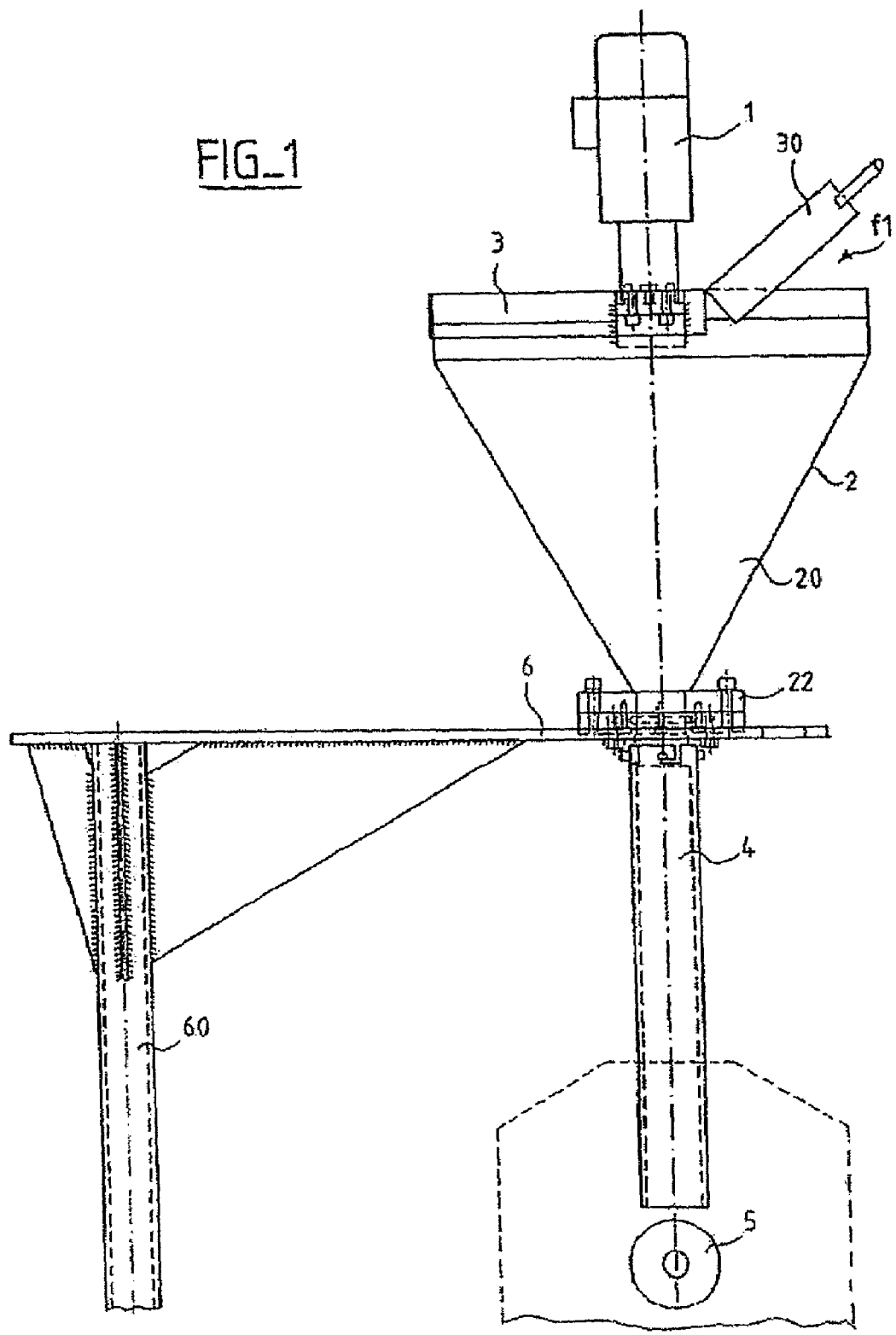
FIG_1

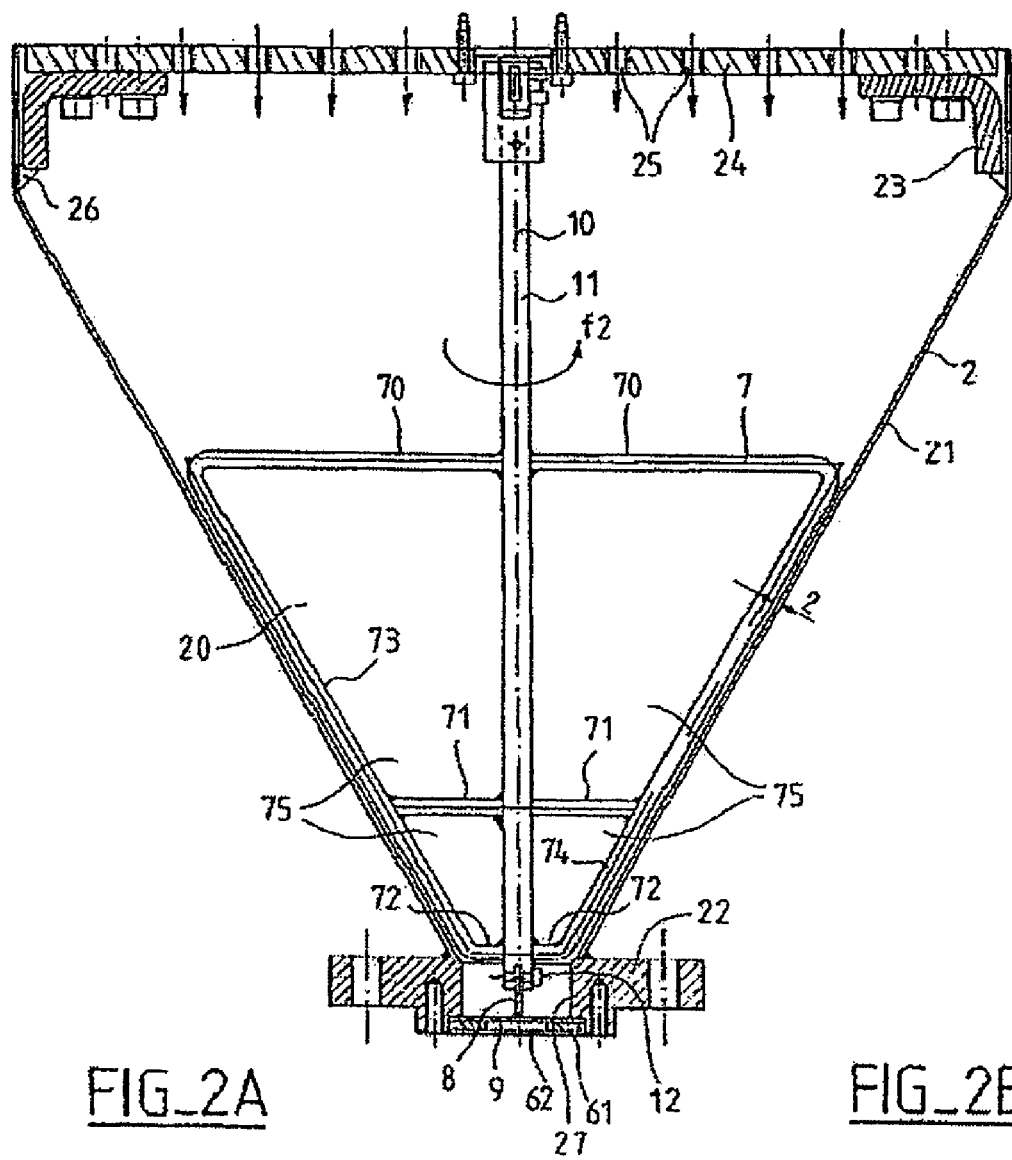
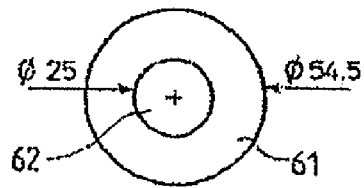
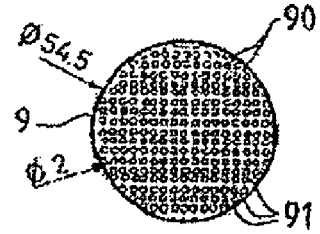

METHOD OF APPLYING MOISTURE-ABSORBENT POWDER ON CABLE ELEMENTS

CROSS-REFERENCE TO RELATED APPLICATIONS

This is a divisional of application Ser. No. 10/878,366 filed Jun. 29, 2004, now U.S. Pat. No. 7,323,057, issued Jan. 29, 2008. The entire disclosure of the prior application, application Ser. No. 10/878,366 is considered part of the disclosure of the accompanying divisional application and is hereby incorporated by reference.

This application is based on French Patent Application No. 03 07 884 filed Jun. 30, 2003, the disclosure of which is hereby incorporated by reference thereto in its entirety, and the priority of which is hereby claimed under 35 U.S.C. § 119.

BACKGROUND OF THE INVENTION

1. Field of the Invention

The invention relates to the field of applicators for applying moisture-absorbent powder on cable elements and to the field of methods of applying moisture-absorbent powder on cable elements. This powder has the function, once the cable has been produced, of absorbing moisture lying in certain elements of the cable so as to prevent this moisture from degrading the properties of these cable elements and of preventing this moisture from propagating along these cable elements.

2. Description of the Prior Art

According to one prior art, it is known to make cable elements, such as optical fibers, or tubes containing optical fibers, pass through a cylinder approximately 600 mm in length connected to a reservoir of moisture-absorbent powder. The powder reservoir is located in the bottom part of the machine. The powder is then sucked up by a Venturi-suction system, the suction being achieved with filtered air and requiring pressure regulation in order to obtain a sufficient powder flow rate. The powder conveyed is then injected into the cylinder under adjustable pressure in order to obtain the necessary amount of powder on the cable elements. The powder is then deposited on the cable elements while they pass through the cylinder, by means of radial powder jets, which powder is conveyed by a compressed gas, such as compressed air, and is injected laterally onto the cable elements. Active means are needed to generate this compressed gas intended for conveying the powder. One drawback of this prior art is that, since the powder is conveyed by a pressurized gas, said powder is dispersed over a wide region in the vicinity of the applicator and of the cable in the process of being assembled. Consequently, there is a risk of other machines or apparatuses in the vicinity of the applicator being contaminated by the powder and having to be frequently stopped for cleaning, which is bothersome. Moreover, the presence of powder on the floor within a perimeter of several meters around the applicator incurs the risk of the operators, moving around near the applicator, falling over. Another drawback is that the flow rate of powder onto the cable elements is relatively irregular.

To solve, or at the very least reduce, all or some of these problems, the invention proposes a different applicator and a different method of application. Instead of conveying the powder by a pressurized gas, in order to inject it laterally, the invention is based on application by powder dropping vertically, with the use of a mechanical stirrer located in a hopper, the movement of the mechanical stirrer, which is a mechanical component whose movement in the hopper stirs the powder contained in the hopper, being sufficient to make the powder flow under gravity as far as the cable elements. The applicator according to the invention, operating under gravity, also has the merit of being simpler than that of the prior art, especially as regards its adjustment and its use. A minor drawback is that, during a stoppage of the applicator lasting several hours, it is necessary to ensure that the powder in the hopper of the applicator is replaced, as otherwise said powder would risk taking up moisture and forming crumbs.

SUMMARY OF THE INVENTION

The invention provides a moisture-absorbent powder applicator, for applying said powder on cable elements, comprising a hopper designed to contain the powder, a mesh closing off the small opening of the hopper and a mechanical powder stirrer located inside the hopper, the stirrer being placed in the hopper so as to be able to make the powder flow through the mesh under gravity, the applicator comprising no means for conveying the powder that has passed through the mesh, this powder continuing to flow under gravity down to the cable elements.

The invention also provides a method of applying moisture-absorbent powder on cable elements, which method comprises a step of placing powder in a hopper of an applicator, and a step of moving a mechanical stirrer in the hopper of the applicator, wherein the powder contained in the hopper flows under gravity as far as a mesh located in the bottom part of the hopper, being stirred by the stirrer, passes through the mesh and continues to flow under gravity until coming into contact with the cable elements.

Preferably, the method according to the invention uses the applicator according to the invention.

To facilitate the flow of the powder through the mesh, while still maintaining a relatively regular flow rate of powder dropping onto the cable elements, the end of the stirrer located on the same side as the small opening in the hopper can preferably move relative to the mesh, in contact with the mesh and placed in such a way as to be able to scrape the mesh so as to help the powder pass through the mesh under gravity.

To allow the powder contained in the hopper to descend more easily toward the mesh, the stirrer is preferably able to rotate relative to the hopper about a rotation axis. A stirrer in the form of a vibrating blade located in the hopper could be envisioned, but the results are far inferior to those with a rotatable stirrer, as there is then a tendency to form a tunnel around the vibrating blade that results in the powder compacting laterally against the walls of the hopper, which then results in sudden detachments of blocks of powder, making the flow rate of powder onto the cable elements irregular.

To control the flow of powder in a very controlled manner along the hopper and to make it pass through the mesh easily, both for stirring the large mass of powder contained within the entire hopper and to fluidize the flow of the powder in the neck formed by the small opening in the hopper and by the mesh that closes off said opening, the stirrer preferably comprises two flat parts that can rotate about the rotation axis, which are joined together and are mutually perpendicular. A slight offset from perpendicularity could be envisioned, but if said parts of the stirrer are parallel, the torque exerted on the small part located at the small opening risks being too high, preventing fluid flow of the powder within said neck. More generally, the stirrer preferably comprises two parts joined together and angularly offset with respect to each other, said parts being placed in such a way that one part is capable of stirring the powder that is intended to be contained in the hopper and in such a way that the other part is capable of fluidizing the flow of the powder in the region of the mesh.

BRIEF DESCRIPTION OF THE DRAWINGS

The invention will be better understood and other features and advantages will become more apparent from the following description and from the appended drawings, given by way of example, in which:

FIG. 1 shows schematically, in side view, an assembly comprising an example of an applicator according to the invention mounted on its support;

FIG. 2 shows schematically, in sectional view, an enlargement of part of the example of an applicator according to the invention shown in FIG. 1;

FIG. 2A shows schematically, in plan view, the element 61 of FIG. 2; and

FIG. 2B shows schematically, in plan view, the element 9 of FIG. 2.

The scale in FIG. 1 is ⅕. The diameter of the hopper 2 at its large opening is 400 mm.

DETAILED DESCRIPTION OF THE INVENTION

FIG. 1 shows schematically, in side view, an assembly comprising an example of an applicator according to the invention mounted on its support. The applicator according to the invention comprises a hopper 2 intended to contain a powder 20, which is introduced at the large opening of the hopper 2, said large opening being covered by a lid 3, a part 30 of which, able to swing away, makes it possible, when it is open, to introduce the powder along the direction of the arrow f1. At the small opening of the hopper 2 there is a ring 22 that is fixed to a support 6, the support being mounted on a pivoting leg 60. Fixed under the support 6 is a tube 4 intended to guide the powder after it has passed through the ring 22. Passing beneath the bottom opening of the tube 4 are the cable elements, denoted by 5, which elements may in particular be optical fibers, or tubes containing optical fibers, in particular loose tubes, which may be arranged around a central strength member, or reinforcing cores. These cable elements 5 run beneath the tube 4 along a preferably helical or SZ-type path in order for the powder to be uniformly distributed over the elements 5 all around the cable. A motor 1 fixed to the applicator is used to move the mechanical stirrer located in the hopper 2 but not shown in FIG. 1.

FIG. 2 shows schematically, in sectional view, an enlargement of part of the example of an applicator according to the invention shown in FIG. 1. The hopper 2 has a side wall 21 in the form of a cone revolution. The large opening of the hopper 2 receives a mesh 24 having holes 25 through which the powder 20 is introduced, said powder dropping under gravity into the hopper 2. The fall of the powder 20 dropping under gravity through the mesh 24 is depicted by the vertical arrows passing through the holes 25. The mesh 24 is fixed to mounts 23 that rest on the projected edges 26 of the hopper 2. The small opening of the hopper 2 ends in the bore 27 of the ring 22. The small opening of the hopper 2 is closed off by a mesh 9 that rests on a washer 61 having in the middle of it a hole 62. The mechanical stirrer is rotated about a rotation axis 10. The mechanical stirrer comprises a filiform part 11 placed along the rotation axis 10. The top of this filiform part 11 is connected to the motor 1 so as to be able to be rotated about the rotation axis 10 by the motor 1. Attached at the bottom of this filiform part 11 by means of a screw 12, so as to be fastened to this filiform part 11, is a plate 8, which is rectangular and solid. Attached to the middle of this filiform part 11, by welding so as to be fastened to this filiform part 11, is the trapezoid 7, which is flat and holed. The trapezoid 7 is formed by three horizontal bars 70, 71 and 72 joined together by bars 73 and 74, which are oblique to the first three bars. The bars 70, 71, 72, 73 and 74 all lie in the same plane, which here is the plane of FIG. 2. The oblique bars 73 and 74 are close to the peripheral wall 21 of the hopper 2 so as to prevent the powder 20 from packing against the wall 21. The places denoted by 75 are holes. The plane of the holed trapezoid 7 is perpendicular to the plane of the plate 8, which is rectangular and solid. The mechanical stirrer is formed by the filiform part 11, by the holed flat trapezoid 7 and by the plate 8, to which are added, of course, the fixing elements such as welded joints or bolts 12 for example.

The powder 20 is introduced into the hopper 2 via the orifice formed by the opening in the swing-away part 30 of the cover 3. The powder 20 may be introduced manually. The powder 20 falls under gravity into the hopper 2 through the holes 25 of the mesh 24. The powder 20 slides along the peripheral wall 21 of the hopper 2. The mechanical stirrer is set in motion by the motor 1. The filiform part 11, the holed trapezoid 7 and the plate 8 rotate about the rotation axis 10 in the direction of the arrow f2 or in the opposite direction. The rotational movement of the mechanical stirrer helps the powder 20 to descend under gravity from the top to the bottom in the hopper 2 until it reaches the bore 27 of the ring 22, and then passes through the mesh 9 before falling under gravity through the tube 4 until it reaches the cable elements 5. The powder 20 is conveyed from top to bottom by gravity, aided only by the rotational movement of the mechanical stirrer inside the hopper 2, before its passage through the mesh 9, which is facilitated by said rotational movement of the mechanical stirrer.

FIG. 2A shows schematically, in plan view, the element 61 of FIG. 2. This is a circular washer 61 comprising a hole 62 in the middle of it, through which the powder passes just after it has passed through the mesh 9.

FIG. 2B shows schematically, in plan view, the element 9 of FIG. 2. The mesh 9 is formed from woven wires 90 interlaced in such a way as to form holes 91 through which the powder flows as it passes through the mesh 9.

Preferably, the hopper has the shape of a right cone of revolution, this shape being the best for facilitating the flow of the powder 20 in the hopper 2 without the powder 20 packing, which packing would occur if the shape of the wall 21 were inwardly or outwardly curved. Preferably, the half-angle of the cone is between 20 degrees and 35 degrees. This is because if the half-angle of the cone is too high, for example around 60 degrees, the powder will have more difficulty in descending under gravity and will have a tendency to remain along the wall 21, whereas if the half-angle is too low, for example around 10 degrees, the powder will have a tendency to pack on itself and have more difficulty in flowing under gravity. This angular range greatly facilitates the flow of the powder under gravity. The half-angle of the cone is advantageously about 30 degrees.

One part of the rotatable stirrer is located in the conical part of the hopper 2 and is in the form of a holed plane trapezoid 7. This plane trapezoid shape 7 is optimal insofar as it allows all the powder located in the bottom part of the hopper 2 to be stirred. This trapezoid 7 is holed so as not to require too large a torque, which otherwise would require a stronger filiform part 11 and a powerful motor 1. However, other shapes could be envisioned but would give inferior results. The holed plane trapezoid 7 is preferably formed from three bars 70, 71 and 72 that are mutually parallel and joined together by two bars 73 and 74 that are oblique to said three bars. The presence of the intermediate bar 71 prevents the formation of a compact mass of powder inside the trapezoid 7, which compact mass would make it difficult for the powder to flow under gravity.

That end of the stirrer located at the small opening of the hopper 2 is preferably a plate 8, which is rectangular and solid. Since the amount of powder is much less near the plate 8 than near the trapezoid 7, the plate 8 can be solid, stirring, at each revolution, all of the powder located near it. The rectangular plate 8 has a shape matched to the bore 27 of the ring 2 in which it lies, whereas the trapezoid 7 has a shape matched to the conical interior of the hopper 2. The plate 8 is preferably made of abrasion-resistant plastic, since, being preferably in contact with the mesh 9, it is advantageous for it to be relatively flexible and abrasion-resistant. The plastic is for example polyacetal.

The mesh 9 is preferably a flexible openwork cloth. Thus, when the cloth 9 is in contact with the plate 8, the plate 8 can always be lightly pressed against the cloth 9, this arrangement allowing the plate 8 to scrape the cloth 9, easily and effectively, so as to prevent the powder from blocking the holes 91 in the cloth 9 and thus making it easier for the powder to flow as it passes through the cloth 9. The cloth 9 is advantageously a metal cloth, which increases its strength so as not to collapse under the weight of the powder that weighs down on it. The cloth is for example made of stainless steel, hence the benefit in particular of the plastic of the plate 8 to be abrasion-resistant. The cloth is, for example, formed from woven wires 90 having a diameter of about 0.4 mm. The permanent contact, by slight pressure, maintained between the plate 8 and the mesh 9 greatly helps the powder to pass through the mesh 9; to do this, it is very useful for the plate 8, like the mesh 9, to be slightly deformable. The mesh 9 is advantageously removable, so that it can be replaced in the event of wear, which however occurs rarely.

The small opening of the hopper 2 preferably terminates in a ring 22 having a cylindrical bore 27. The ring 22 is, for example, made of steel. The difference between the length of the plate 8, which is parallel to the diameter of the bore 27, and the diameter of the bore 27 itself is preferably, on the one hand, large enough for the stirrer to be self-centered with respect to its rotation axis and, on the other hand, small enough to prevent the powder from packing against the walls of the bore 27. Said difference between said length and said diameter is advantageously about 0.5 mm. Said length lies in a plane perpendicular to the plane of FIG. 2.

The applicator preferably includes a variable-speed motor 1. The speed of the motor 1 may thus be adapted so as to deliver various rates of flow of powder onto the cable elements 5, depending on their requirements. The larger the number and the size of the cable elements 5, and consequently the larger the final diameter of the cable obtained, the higher the rotation speed in revolutions per minute of the motor 1 has to be. The motor 1 includes, for example, a potentiometric speed changer for regulating its speed. The motor 1 is advantageously removable.

The applicator preferably includes, downstream of the mesh 9, a tube 4 coaxial with the hopper 2, said tube being intended to guide the powder between the mesh 9 and the cable elements 5. The diameter of the tube 4 is preferably not too large, so as to prevent the powder from dispersing outside a working area located in the immediate vicinity of the cable elements 5. The diameter of the tube 4 is advantageously less than 100 mm. For example, the diameter of the tube 4 is about 50 mm. Advantageously, the internal walls of the tube 4 are smooth so as to prevent the powder from sticking thereon. Depending on the type of application envisioned, forms of guide other than a tube would be conceivable, but a tube has the most effective and simplest shape.

Preferably, the applicator includes a lid 3, which is removable and has a spring-away opening 30, covering the large openwork opening 24 of the hopper 2. The powder may thus be supplied manually.

During implementation of the method of application according to the invention, the applicator used is preferably mounted on a pivoting support 6, which is rotationally retractable. In fact, the support 6 is actually mounted on a leg 6 that can pivot. Thus, the various operations during implementation of the method are facilitated and require less space.

The powder used is preferably talc. It could also for example be a graphite powder or a PTFE powder. The speed of the motor 1 and the diameter of the holes 91 of the mesh 9 are preferably matched to each type of powder used.

The cable elements 5 preferably relate to a fiber-optic cable. The powder is then preferably applied before the stranding operation. In a preferred example of a fiber-optic cable according to the invention, reinforcing cores are delivered by a rotating cage and undergo a helical movement. Optical-fiber tubes, for example of the loose-tube type, are delivered by a rotating cage and undergo an SZ-type movement inside these cores. Running linearly on the inside of the optical-fiber tubes is a central strength member. The working space before stranding extends over about 70 mm, which makes the applicator according to the invention very useful as it is then sufficient to choose, for this, a diameter of the powder-guiding tube 4 of less than 70 mm, for example about 50 mm. Beyond this space, the cores are already too tightly bunched and the powder can no longer pass between the cores and drop onto the optical-fiber tubes. The 600 mm—long cylinder of the prior art would have required much more space in order to be fitted. The fiber-optic cable may comprise more than twenty optical-fiber tubes, for example twenty-four optical-fiber tubes, each containing several optical fibers and being intended to receive the powder.

The stirrer can rotate, and it rotates at a speed of preferably several hundred revolutions per minute, for example ranging from 100 to 500 revolutions per minute depending on the diameter of the cable produced.

The powder flow rate that can be achieved is preferably greater than 200 grams per minute and may for example be up to about 400 grams per minute. The variable-speed motor 1 thus allows the powder flow rate to be adjusted very simply. An applicator according to the prior art can deliver only about 60 grams per minute. Consequently, with large-diameter cables, the applicator according to the invention, thanks to a preferentially high flow rate, can be used while still making the cable run at a relatively high speed, whereas the run speed would have been markedly lower with an applicator according to the prior art. For example, for a cable having a diameter of 13 mm and possessing 24 loose tubes, the run speed may be 50 meters per minute, which is high.

Any powder falling onto the cable elements 5 without remaining attached thereto is preferably recovered in a receptacle located beneath the cable elements 5. This powder can thus be reused, although financially this is relatively unattractive on account of the low cost of the powder, which is for example talc. However, more importantly, any powder that has not remained attached to the cable elements 5 would, without said receptacle, have dropped onto the ground with the risk of being dispersed in the immediate vicinity of the applicator, something which it is advantageous to avoid.

What is claimed is:

1. A method of applying moisture-absorbent powder on cable elements, comprising the following steps:

providing an applicator having a hopper, the hopper including:
- a conical portion and a bottom portion and having an opening therein;
- a mesh (9) closing off the opening of the hopper (2); and
- a mechanical powder stirrer located inside the hopper (2), the stirrer being placed in the hopper (2) so as to be able to make the powder (20) flow through the mesh under gravity and having a bottom end, wherein the bottom end (8) of the stirrer located in the same side as the opening in the hopper (2) is moveable relative to the mesh (9) and in contact therewith so as to be able to scrape the mesh (9) and thereby help the powder pass through the mesh (9) under gravity, wherein the stirrer is able to rotate relative to the hopper (2) about a rotation axis (10), wherein the stirrer comprises a first part and a second part, the first part including a solid plate located at the bottom end of the stirrer and moveable relative to the mesh (9) and in contact therewith so as to be able to scrape the mesh (9) and thereby help the powder pass through the mesh (9) under gravity, and the second part located in said conical portion of the hopper and including a trapezoidal-shaped plate which is received in the conical portion and has a complimentary shape, said trapezoidal-shaped plate having perforations therein;

placing a powder in the hopper (2);

conveying the cable elements below the opening in the hopper; and rotating the mechanical stiffer in the hopper (2) of the applicator relative to the mesh and in contact therewith such that the powder (20) contained in the hopper (2) flows under gravity as far as the mesh (9) located in the bottom part of the hopper (2), being stirred by the stirrer (9), passes through the mesh and continues to flow under gravity until coming into contact with the cable elements (5).

2. The method of application as claimed in claim 1, further comprising the step of mounting the applicator on a pivoting support (6), which is rotationally retractable.

3. The method of application as claimed in claim 1, wherein the powder is talc.

4. The method of application as claimed in claim 1, wherein the conveying step includes the step of conveying a fiber-optic cable.

5. The method of application as claimed in claim 4, wherein the fiber-optic cable comprises more than 20 tubes, each containing several optical fibers and being intended to receive the powder.

6. The method of application as claimed in claim 1, wherein the of rotating the stirrer comprises rotating the stirrer at a speed of 100 to 500 revolutions per minute.

7. The method of application as claimed in any claim 1, wherein a flow rate of the power exiting the mesh is greater than 200 grams per minute.

8. The method of application as claimed in claim 7, wherein the powder flow rate is about 400 grams per minute.

9. The method of application as claimed in claim 1, further comprising the step of recovering the powder falling onto the cable elements (5) without remaining attached thereto in a receptacle located beneath the cable elements (5).

* * * * *